(12) United States Patent
Yang

(10) Patent No.: US 7,574,944 B2
(45) Date of Patent: Aug. 18, 2009

(54) HIGH-DURABILITY CAM WHEEL ASSEMBLY

(75) Inventor: Ming-Chieh Yang, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 491 days.

(21) Appl. No.: 11/455,337

(22) Filed: Jun. 19, 2006

(65) Prior Publication Data

US 2007/0295211 A1    Dec. 27, 2007

(30) Foreign Application Priority Data

May 4, 2006    (TW) ............................ 95207619 U

(51) Int. Cl.
*F16H 53/00* (2006.01)
*H04M 1/11* (2006.01)
(52) U.S. Cl. .............. 74/567; 74/56; 74/107; 74/568 R; 74/569; 16/303; 16/330; 379/433.13
(58) Field of Classification Search ........... 74/567–569, 74/56, 107, 492–493, 497; 16/303, 330; 379/433.13
See application file for complete search history.

(56) References Cited

U.S. PATENT DOCUMENTS 5,109,571 A * 5/1992 Ohshima et al. .............. 16/307
5,774,938 A * 7/1998 Kent et al. .................... 16/332
5,799,371 A * 9/1998 Lin ............................... 16/330
6,115,886 A * 9/2000 Fujita .......................... 16/330
2005/0276412 A1 * 12/2005 Kfoury .................. 379/433.13

* cited by examiner

*Primary Examiner*—Thomas R Hannon
*Assistant Examiner*—Thomas Diaz
(74) *Attorney, Agent, or Firm*—Guice Patents PLLC

(57) ABSTRACT

Disclosed is a high-durability cam wheel assembly, which includes a fixed member, which has a center axle hole and one pair of first interference members symmetrically disposed at one side thereof, and a movable member, which has a center mounting hole axially aimed at the center axle hole of the fixed member, a pair of guide axially symmetrically extending from one side of the periphery of the center mounting hole and inserted into the center axle hole of the fixed member for guiding rotation of the movable member relative to the fixed member, and a pair of second interference member arranged on one side thereof around the guide rods and the center mounting hole and disposed in contact with the first interference members of the fixed member for causing a torsional force upon rotation of the movable member relative to the fixed member through an angle.

5 Claims, 5 Drawing Sheets

HIGH-DURABILITY CAM WHEEL ASSEMBLY

BACKGROUND OF THE INVENTION

1. Field of the Invention

The present invention relates a cam wheel assembly for use in a hinge structure and more particularly, to a high-durability cam wheel assembly, which is durable in use and has means to guide rotation of the movable member relative to the fixed member in a balanced manner.

2. Description of the Related Art

Many products that we use frequently have a hinged structure that allowing turning of two coupled members relative to each other. For example, a door uses a hinged structure so that the user can turn the door panel relative to the doorframe to open/close the access. There are many mobile electronic products using hinge structures. For example, a notebook computer, electronic dictionary or mobile video disk player uses hinge structures for allowing the cover member (which carries a LCD display panel inside) to be turned relative to the base member between an open position and a close position.

A hinged structure for the aforesaid application uses two interference members, for example, friction members or cam wheel members for causing a torsional friction force upon rotation of the movable member relative to the fixed member so that the cover member of the mobile electronic product can be positively positioned in the desired angle.

A cam wheel assembly for the aforesaid application generally comprises a fixed member and a movable member. The fixed member is mounted on an object, for example, a bracket around a shaft member. The movable member has a center mounting hole coupled to the shaft member for rotation with the shaft member relative to the fixed member. The durability of the cam wheel assembly can be known only after a 20,000~25,000 cycles of open and close test. According to the aforesaid cam wheel assembly design, the bearing force of the movable member received during its rotation with the shaft member is concentrated on the periphery of the center mounting hole. Therefore, the periphery of the center mounting hole of the movable member wears quickly with use. When the periphery of the center mounting hole of the movable member starts to wear, the work life of the cam wheel assembly is shortened, and the cam wheel assembly will be unstable to provide the designed torsional force. Further, according to the aforesaid prior art design, the fixed member has a radially extending mounting portion and a pin extended from the radially extending mounting portion for fastening to the bracket. The radially extending mounting portion greatly increases space occupation of the cam wheel assembly in the mobile electronic product, bringing a space arrangement problem. Further, because the fixed member is supported on the bracket by means of the pin at the radially extending mounting portion, the connection between the fixed member and the bracket is not strong.

SUMMARY OF THE INVENTION

The present invention has been accomplished under the circumstances in view. It is the main object of the present invention to provide a high-durability cam wheel assembly, which eliminates the drawbacks of the aforesaid prior art design.

According to one aspect of the present invention, the high-durability cam wheel assembly comprises a fixed member, and a movable member. The fixed member has a center axle hole, and at least one pair of first interference members symmetrically disposed at a first side thereof. The movable member comprises a center mounting hole axially aimed at the center axle hole of the fixed member, at least one pair of guide axially symmetrically extending from one side of the periphery of the center mounting hole and inserted into the center axle hole of the fixed member for guiding rotation of the movable member relative to the fixed member, and at least one pair of second interference member arranged on one side thereof around the at least one pair of guide rods and the center mounting hole and disposed in contact with the at least one pair of first interference members of the fixed member for causing a torsional force upon rotation of the movable member relative to the fixed member through an angle.

According to another aspect of the present invention, the high-durability cam wheel assembly further comprises a shaft member inserted through the center axle hole of the fixed member and coupled to the center mounting hole of the movable member for rotating the movable member relative to the fixed member.

According to still another aspect of the present invention, the fixed member comprises a plurality of mounting lugs protruded from a second side thereof for mounting, and the mounting lugs of the fixed member are equiangularly spaced around the center axle hole.

According to still another aspect of the present invention, the center axle hole of the fixed member is a circular through hole; the guide rods each have a smoothly arched outer wall fitting and disposed in contact with the circular periphery of the center axle hole of the fixed member.

According to still another aspect of the present invention, the first interference members of the fixed member include a first outer sliding block, a first inner sliding block, a second outer sliding block and a second inner sliding block alternatively arranged on the first side around the center axle hole of the fixed member; the second interference members of the movable member include a first outer sliding groove, a first inner sliding groove, a second outer sliding groove and a second inner sliding groove alternatively arranged around the center mounting hole of the movable member corresponding to the outer and inner sliding blocks of the fixed member.

According to still another aspect of the present invention, the outer and inner sliding blocks of the fixed member are wedged blocks each having two distal ends and a beveled edge at each of the two distal ends; the outer and inner sliding grooves of the movable member are wedged grooves each having two distal ends and a beveled edge at each of the two distal ends.

DETAILED DESCRIPTION OF THE INVENTION

Figure 1:
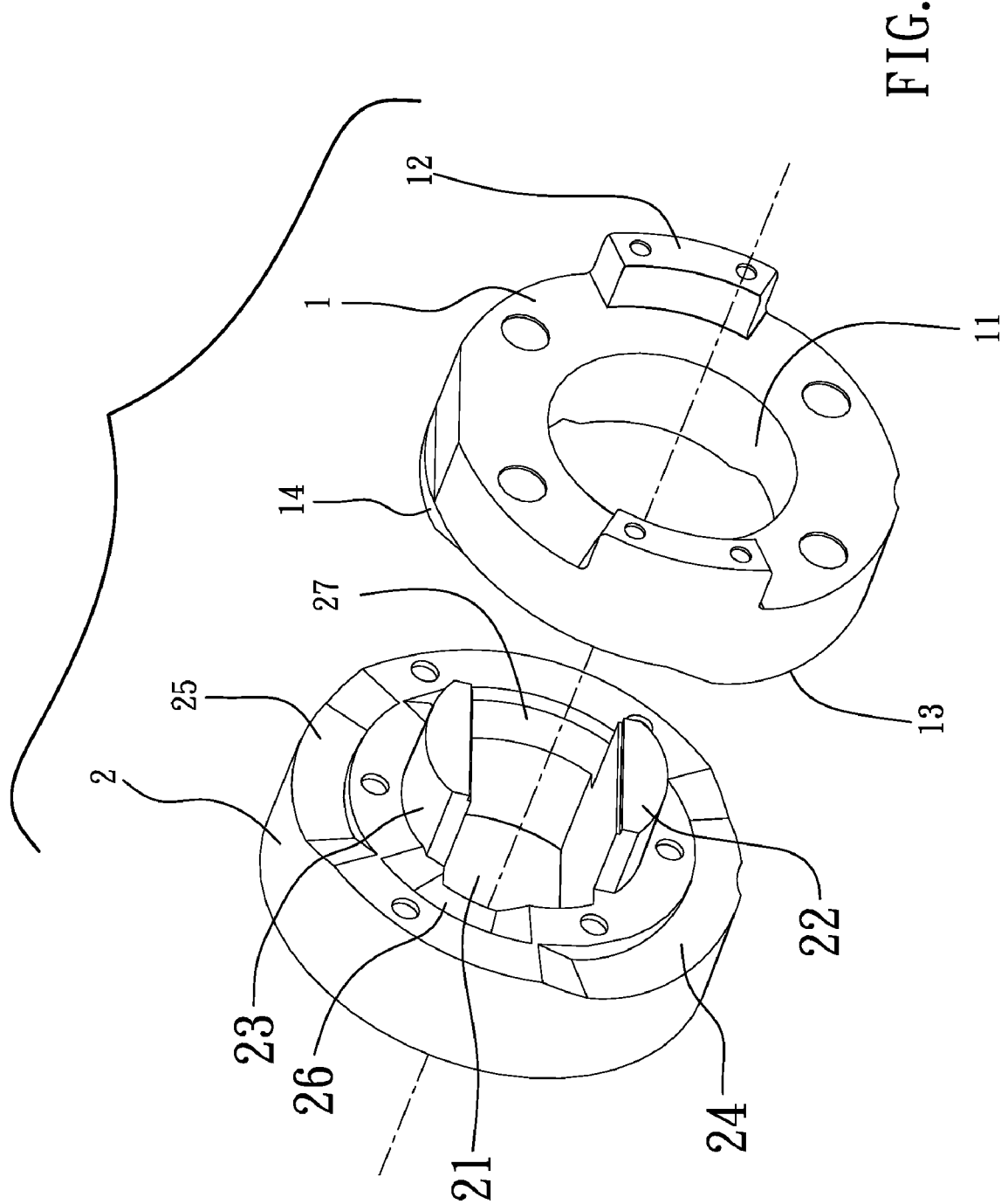
FIG. 1 is an exploded view of a high-durability cam wheel assembly according to the present invention.
Figure 2:
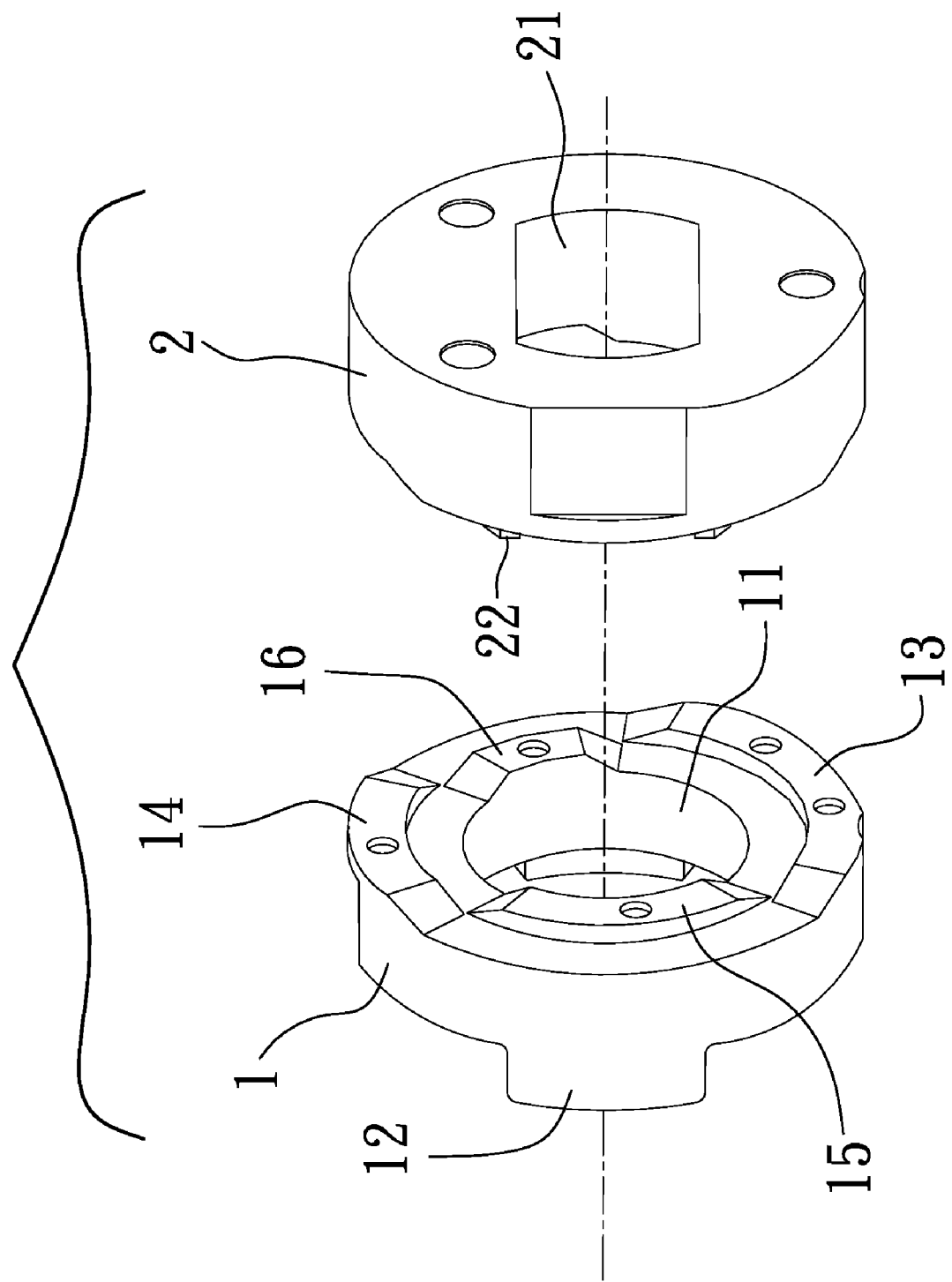
FIG. 2 is another exploded view of the high-durability cam wheel assembly cane according to the present invention when viewed from another angle.

Referring to FIGS. 1 and 2, a high-durability cam wheel assembly in accordance with the present invention is shown comprised of a fixed member 1, and a movable member 2.

The fixed member 1 is an annular member having a circular center axle hole 11 for the passing of a shaft member (not shown), a plurality of, for example, two mounting lugs 12 protruded from one sidewall thereof and symmetrically disposed at two sides relative to the circular center axle hole 11 for fastening to an external body, for example, the mounting holes of a bracket (not shown) to fixedly secure the fixed member 1 to one side of the bracket. The arrangement of the mounting lugs 12 on one sidewall of the fixed member 1 allows easy and steady installation of the fixed member 1 in the bracket. Further, this arrangement enables the fixed member 1 to bear the pressure evenly.

The fixed member 1 further comprises interference members alternatively arranged on the other sidewall thereof around the circular center axle hole 11, i.e., a first outer sliding block 13, a second outer sliding block 14, a first inner sliding block 15, and a second inner sliding block 16. The first outer sliding block 13, the second outer sliding block 14, the first inner sliding block 15 and the second inner sliding block 16 are alternatively arranged around the circular center axle hole 11, i.e., the ends of the first outer sliding block 13 and the second outer sliding block 14 are respectively abutted against the ends of the first inner sliding block 15 and the second inner sliding block 16. These sliding blocks 13~16 are wedge blocks each having a beveled edge at each of the two distal ends.

The movable member 2 is an annular member abutted against one sidewall of the fixed member 1, having a non-circular center mounting hole 21 coupled to the shaft member that is inserted through the circular center axle hole 11 of the fixed member 1 for synchronous rotation with the shaft member and one pair of guide rods 22 axially and bilaterally extending from one side of the non-circular center mounting hole 21 and inserted into the circular center axle hole 11 of the fixed member 1. The guide rods 22 each have a smoothly arched outer wall 23 supported on and fitting the circular periphery of the circular center axle hole 11 of the fixed member 1 so that the guide rods 22 are moved along the circular periphery of the circular center axle hole 11 of the fixed member 1 during rotation of the movable member 2 with the shaft member. The guide rods 22 relatively increase the surface area of the non-circular center mounting hole 21, i.e., relatively increase the contact area between the movable member 2 and the shaft member, therefore the non-circular center mounting hole 21 of the movable member 2 does not wear quickly with use. Further, because the smoothly arched outer wall 23 of each guide rod 22 is supported on and movable along the circular periphery of the circular center axle hole 11 of the fixed member 1 during rotation of the movable member 2 with the shaft member, the guide rods 22 guide rotation of the movable member 2 against biasing.

The movable member 2 further comprises interference members alternatively arranged on one sidewall thereof around the guide rods 23, i.e., a first outer sliding groove 24, a second outer sliding groove 25, a first inner sliding groove 26, and a second inner sliding groove 27. The first outer sliding groove 24, the second outer sliding groove 25, the first inner sliding groove 26 and the second inner sliding groove 27 are alternatively arranged around the non-circular center mounting hole 21, i.e., the ends of the first outer sliding groove 24 and the second outer sliding groove 25 are respectively abutted against the ends of the first inner sliding groove 26 and the second inner sliding groove 27. These sliding grooves 24~27 are wedge grooves each having a beveled edge at each of the two distal ends.

Figure 3:
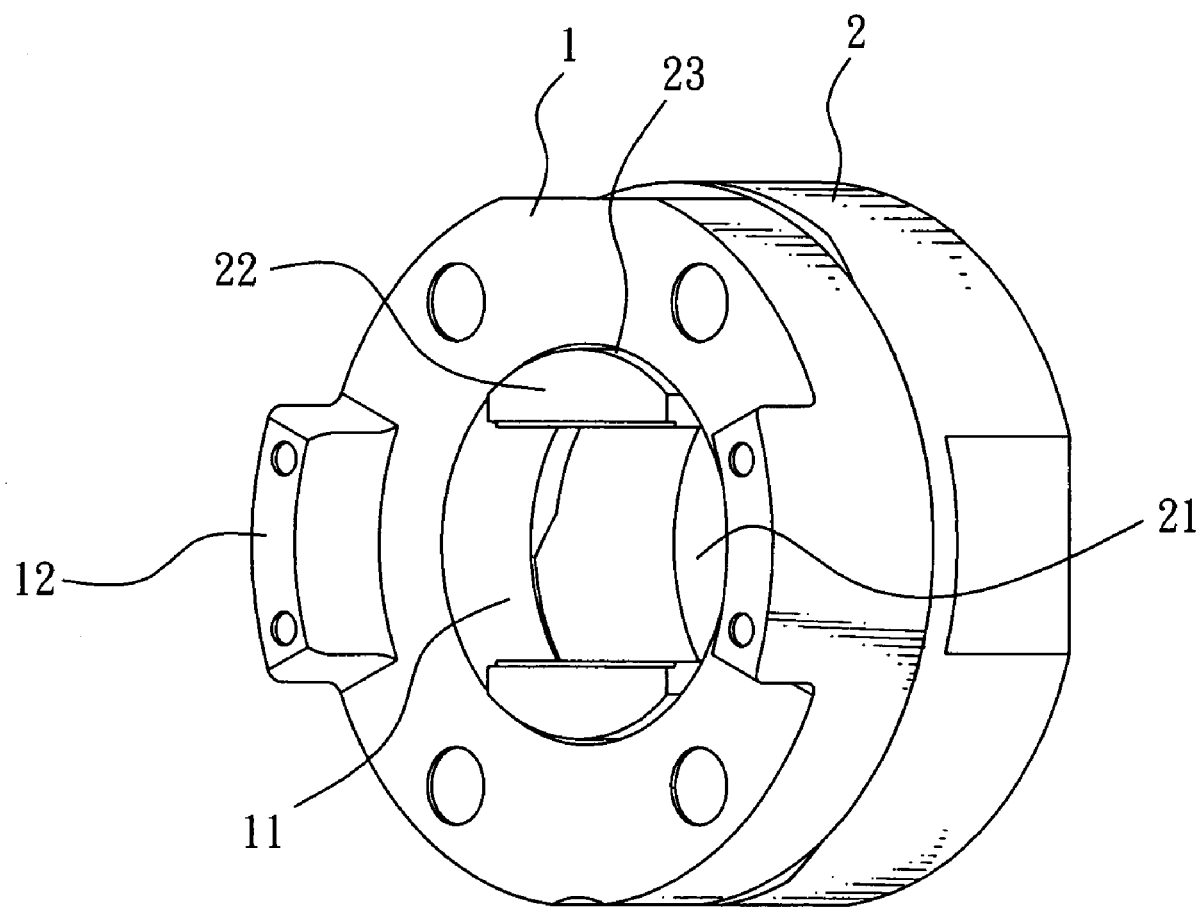
FIG. 3 is an elevational assembly view of the high-durability cam wheel assembly according to the present invention.
Figure 4:
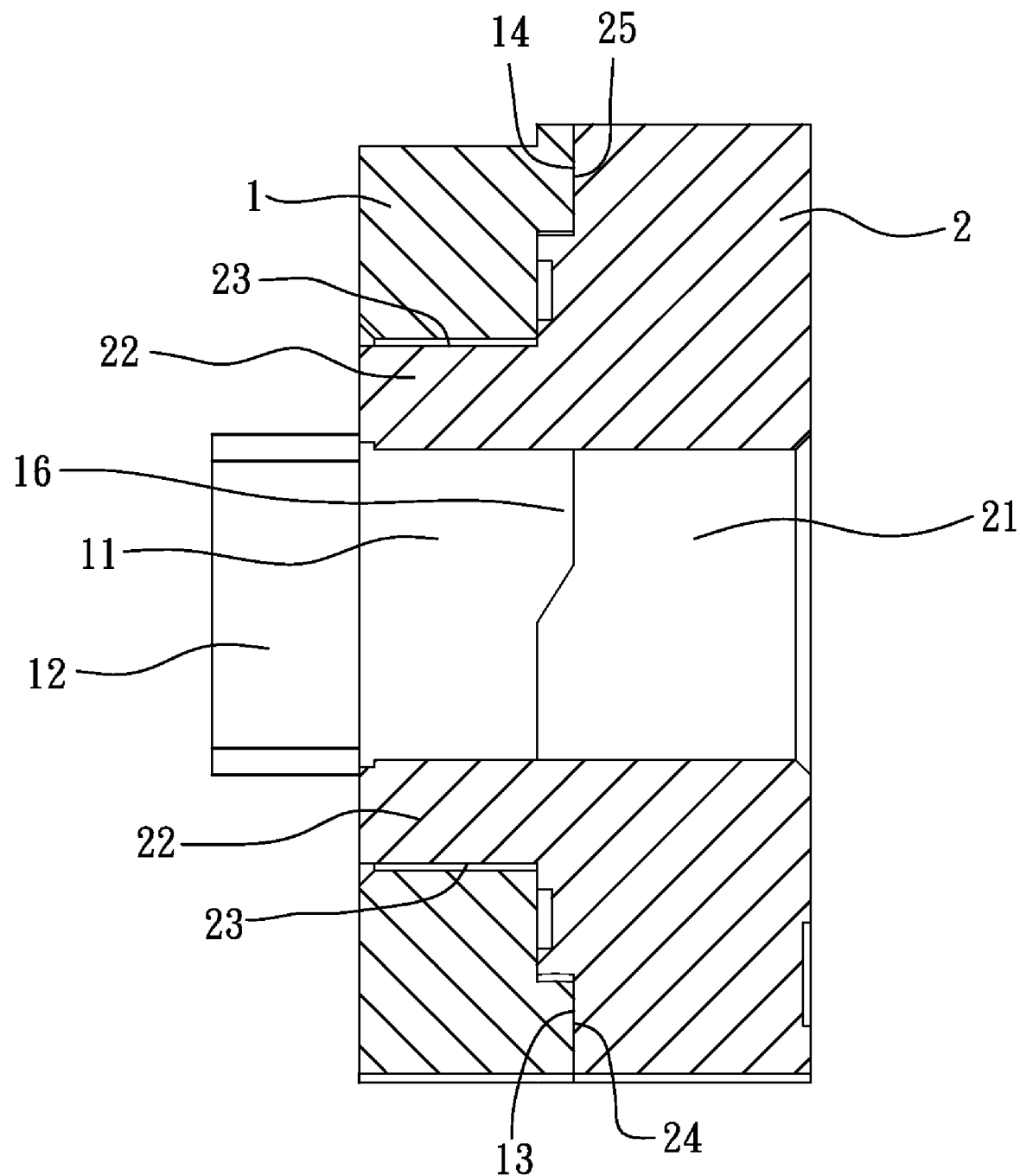
FIG. 4 is a sectional view of the high-durability cam wheel assembly according to the present invention.

When the high-durability cam wheel assembly is assembled as shown in FIGS. 3 and 4, the guide rods 22 of the movable member 2 are respectively inserted through the circular center axle hole 11 of the fixed member 1 and disposed in contact with the circular periphery of the circular center axle hole 11, and the sliding blocks 13~16 are respectively received in the sliding grooves 24~27. At this time, the high-durability cam wheel assembly is not operated, and the cover member of a movable electronic apparatus, for example, a notebook computer (not shown) that is connected to the shaft member is closed on the base member off the notebook computer.

Figure 5:
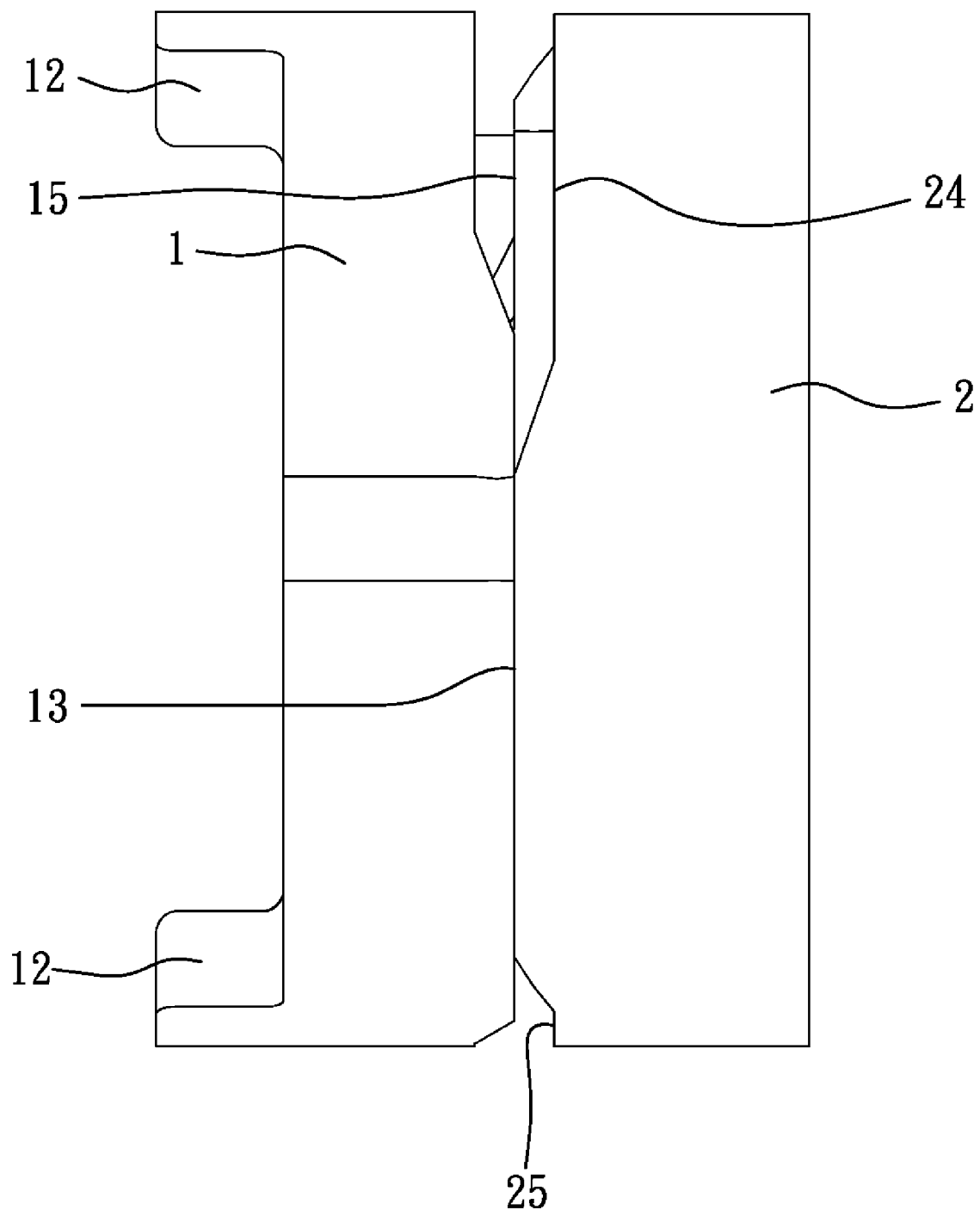
FIG. 5 is a schematic sectional view of the present invention, showing the high-durability cam wheel assembly in operation.

Referring to FIG. 5, when opening the cover member, the movable member 2 is rotated with the shaft member and the cover member of the notebook computer relative to the fixed member 1 and the base member of the notebook computer, i.e., the smoothly arched outer wall 23 of each guide rod 22 is moved along the circular periphery of the circular center axle hole 11 of the fixed member 1 through an angle. At this time, the outer and inner sliding grooves 24~27 are respectively moved outwards relative to the fixed member 1 along the respective beveled edges at the ends of the outer and inner sliding blocks 13~16 to compress spring means (not shown) of the notebook computer, thereby forming a relatively greater torsional force. After the outer and inner sliding grooves 24~27 of the movable member 2 have been moved over beveled edges of the outer and inner sliding blocks 13~17 of the fixed member 1, the torsional force is relatively reduced. Because the outer and inner sliding grooves 24~27 and the outer and inner sliding grooves 13~16 are respectively alternatively arranged around the non-circular center mounting hole 21 or circular center axle hole 11, the movable member 2 is constantly supported on the fixed member 1 in a balanced manner. When one relatively greater sliding groove of the movable member 2 is moved to one relatively smaller sliding block of the fixed member 1, the relatively smaller sliding block does not fall to the relatively greater sliding groove because the other three sliding blocks support the movable member 2 on the outside of the relatively greater sliding groove, and therefore the movable member 2 is prohibited from tilting and kept is balance.

When turning the cover member of the notebook computer in the reversed direction to the close position, the movable member 2 is moved along the outer and inner sliding blocks 13~16 of the fixed member 1 in the reversed direction and then moved along the respective beveled edges of the sliding blocks 13~16 to have the respective outer and inner sliding grooves 24~27 be respectively matched with the respective the outer and inner sliding blocks 13~16, thereby achieving the self-locking function.

As indicated above, the invention provides a high-durability cam wheel assembly, which eliminates the drawback of short working life of the prior art design due to limited contact area between the center mounting hole of the movable member and the shaft member. Further, the guide rods of the movable member guide stable rotation of the movable member relative to the fixed member, keeping the movable member constantly in balance. Further, except the mounting lugs of the fixed member for mounting, the fixed member does not have any protruding part around the periphery, therefore the fixed member bears the pressure of the movable member evenly. Further, the matching arrangement between the interference members (sliding grooves) of the movable member and the interference members (sliding blocks) of the fixed member prevents tilting of the movable member relative to the fixed member during rotation of the movable member relative to the fixed member.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A cam wheel assembly comprising:
   a fixed member having a center axle hole and at least one pair of first interference members symmetrically disposed at a first side thereof; and
   a movable member comprising a center mounting hole axially aimed at said center axle hole of said fixed member, at least one pair of guide rods axially symmetrically extending from one side of the periphery of said center mounting hole and inserted into the center axle hole of said fixed member for guiding rotation of said movable member relative to said fixed member, and at least one pair of second interference member arranged on one side thereof around said at least one pair of guide rods and said center mounting hole and disposed in contact with the at least one pair of first interference members of said fixed member for causing a torsional force upon rotation of said movable member relative to said fixed member through an angle;
   wherein the first interference members of said fixed member include a first outer sliding block, a first inner sliding block, a second outer sliding block and a second inner sliding block; wherein each of said first outer sliding block, said first inner sliding block, said second outer sliding block and said second inner sliding block are alternatively arranged on the first side around the center axle hole of said fixed member; the second interference members of said movable member include a first outer sliding groove, a first inner sliding groove, a second outer sliding groove and a second inner sliding groove; wherein each of said first outer sliding groove, said first inner sliding groove, said second outer sliding groove and said second inner sliding groove are alternatively arranged around the center mounting hole of said movable member corresponding to the first outer sliding block, the first inner sliding block, the second outer sliding block and the second inner sliding block of said fixed member.

2. The cam wheel assembly as claimed in claim 1, wherein said fixed member comprises a plurality of mounting lugs protruded from a second side thereof for mounting.

3. The cam wheel assembly as claimed in claim 2, wherein said mounting lugs are equiangularly spaced around said center axle hole.

4. The cam wheel assembly as claimed in claim 1, wherein said center axle hole of said fixed member is a circular through hole; said guide rods each have an arched outer wall fitting and disposed in contact with the circular periphery of said center axle hole of said fixed member.

5. The cam wheel assembly as claimed in claim 1, wherein the outer and inner sliding blocks of said fixed member are wedged blocks each having two distal ends and a beveled edge at each of the two distal ends; the outer and inner sliding grooves of said movable member are wedged grooves each having two distal ends and a beveled edge at each of the two distal ends.

* * * * *